US012224539B2

(12) United States Patent
Liao

(10) Patent No.: US 12,224,539 B2
(45) Date of Patent: Feb. 11, 2025

(54) POWER ADAPTER AND ELECTRONIC CONNECTOR

(71) Applicant: GUANGDONG GOPOD GROUP HOLDING CO., LTD., Shenzhen (CN)

(72) Inventor: Zhuowen Liao, Shenzhen (CN)

(73) Assignee: GUANGDONG GOPOD GROUP HOLDING CO., LTD., Shenzhen (CN)

( * ) Notice: Subject to any disclaimer, the term of this patent is extended or adjusted under 35 U.S.C. 154(b) by 370 days.

(21) Appl. No.: 17/869,834

(22) Filed: Jul. 21, 2022

(65) Prior Publication Data

US 2022/0360034 A1 Nov. 10, 2022

Related U.S. Application Data

(63) Continuation of application No. PCT/CN2020/095894, filed on Jun. 12, 2020.

(51) Int. Cl.

*H01R 31/06* (2006.01)
*H01R 13/04* (2006.01)
*H01R 13/502* (2006.01)
*H01R 24/68* (2011.01)
*H01R 13/66* (2006.01)

(52) U.S. Cl.

CPC ........... *H01R 31/065* (2013.01); *H01R 13/04* (2013.01); *H01R 13/502* (2013.01); *H01R 24/68* (2013.01); *H01R 13/665* (2013.01)

(58) Field of Classification Search

CPC .... H01R 31/065; H01R 13/04; H01R 13/502; H01R 24/68; H01R 13/665; H01R 13/514; H01R 27/00; H01R 31/06

See application file for complete search history.

(56) References Cited

U.S. PATENT DOCUMENTS 5,628,641 A * 5/1997 Hahn ..................... H01R 27/00 439/131
2014/0235079 A1 8/2014 Wallace
(Continued)

FOREIGN PATENT DOCUMENTS

CN 202737204 U 2/2013
CN 208209135 U * 12/2018
CN 209592549 U 11/2019

OTHER PUBLICATIONS

Internation Search Report of PCT/CN2020/095894, Mailed Mar. 17, 2021.

*Primary Examiner* — Abdullah A Riyami
*Assistant Examiner* — Nader J Alhawamdeh

(57) ABSTRACT

A power adapter and an electronic connector are disclosed, the power adapter includes a base, a plug-in mechanism, a reset mechanism and a limiting mechanism; the plug-in mechanism includes a body plug and a swinging piece; the swinging piece is switchable between a first swinging position and a second swinging position through circular motion; a reset mechanism connected to the swing piece and the base is capable of applying a reset force to the swing piece when it is in the first swing position; the limiting mechanism is capable of limiting movement of the swing piece when it is at the first swing position and releasing limitation of the swing piece when it is at the unlocked position. Volumes of the swing piece and the reset mechanism can be smaller to diminish internal space dimension for the plug-in mechanism rotating, the overall volume is further reduced.

14 Claims, 9 Drawing Sheets

(56) References Cited

U.S. PATENT DOCUMENTS

| | | | | |
|---|---|---|---|---|
| 2016/0197431 | A1* | 7/2016 | Hsu | H01R 31/065 439/131 |
| 2022/0360034 | A1* | 11/2022 | Liao | H01R 27/00 |

* cited by examiner

POWER ADAPTER AND ELECTRONIC CONNECTOR

CROSS-REFERENCE TO RELATED APPLICATIONS

This application is a continuation of International Patent Application No. PCT/CN2020/095894 with a filing date of Jun. 12, 2020, designating the United States, now pending. The content of the aforementioned applications, including any intervening amendments thereto, are incorporated herein by reference.

TECHNICAL FIELD

The present disclosure relates to a technical field of electronic device fittings, especially relates to a power adapter and an electronic connector.

BACKGROUND

With the popularization of electronic products, requirements for the power adapters are gradually higher, the power adapters in market are provided with rotatable storage plug bodies, however, plug bodies mostly need to be manually rolled out. And the power adapters with the plug bodies automatically popping out, generally rotating shafts of the plug bodies are sleeved with torsion springs, when the rotating shaft is rotating on its axis, the torsion spring is storing or releasing energy during elastic deformation, but on one hand, the torsion spring needs to be sleeved outside the rotating shaft for limitation, on the other hand, the torsion spring needs a large torsion to rotate the plug body, so the torsion spring needs to own a larger dimension. But the torsion spring with the large dimension may occupy a large internal space in the power adapter, thus thickness of the power adapter is increased, which is not convenient to carry.

SUMMARY

The purpose of the present application is to provide a power adapter and an electronic connector, aiming at solving a technical problem that the power adapters with plug bodies capable of automatically popping out have a large dimension and occupy a large space in the prior art.

In first embodiments of the present application disclose a power adapter, comprising:

- a base, having a mounting cavity;
- a plug-in mechanism, having a plug body rotatably connected to the base and a swinging piece connected to the plug body and disposed in the mounting cavity; the swinging piece capable of performing circular motion around an axis of the plug body to drive the plug body to rotate; the swinging piece switchable between a first swinging position and a second swinging position through the circular motion; the plug body capable of electrically connecting with an external power supply when the swinging piece is at the second swinging position;
- a reset mechanism, connected to the swinging piece and the base; the reset mechanism capable of applying a reset force to the swing piece and leading the swing piece to move towards the second swinging position when the swinging piece is at the first swinging position;

- a limiting mechanism, having a limiting position and an unlocking position; the limiting mechanism capable of limiting the swinging piece to move when the swinging piece is at the first swinging position and the limiting mechanism is at the limiting position; the limiting mechanism further capable of releasing the limit of the swinging piece to cause the reset mechanism to release the reset force when the limiting mechanism is at the unlocking position.

In one embodiment, the reset mechanism comprises a reset piece connected to the swinging piece and a sliding piece connected to the reset piece, the sliding piece is slidably connected to the base and capable of sliding between a first sliding position and a second sliding position, the reset piece is capable of applying a reset force to the swing piece and leading the swing piece to move towards the second swing position when the swing piece is at the first swing position; the reset piece is capable of releasing the reset force to the swing piece and leading the swing piece to move from the first swing position to the second swing position, then leading the sliding part to move from the first sliding position to the second sliding position.

In one embodiment, the base is provided with a slideway on a wall of the mounting cavity, the sliding piece is slidably connected to the slidway.

In one embodiment, the plug body comprises a rotating shaft rotatably connected to the base and a body pin connected to the rotating shaft, the body pin is capable of electrically connecting with an external power supply when the swinging piece is in the second swinging position, the swinging piece comprises a connecting part connected to the rotating shaft and a swinging part connected to the connecting part and arranged at intervals with the rotating shaft, the reset piece is a torsion spring sleeved on the swinging part; one end of the reset piece is connected to the plug-in mechanism and the other end is connected to the sliding piece.

In one embodiment, the base is provided with a first storage slot, the body pin is stored in the first storage slot when the swinging piece is at the first swing position.

In one embodiment, the rotating shaft comprises a rotating part rotatably connected to the base and a limiting part connected to the rotating part, the limiting part is provided with a limiting slot, the plug-in mechanism further comprises a limiting pin rotatably connected to the base; when the swinging piece is moved from the first swinging position to the second swinging position, the limiting part is capable of driving the limiting pin to rotate from a first matching position to a second matching position, the limiting pin can rotate from the second matching position to the first matching position under the action of external force, to push the limiting part to rotate, and to cause the swinging piece is moved from the second swinging position to the first swinging position; the limiting pin is at least partially received in the limiting slot when it is at the first matching position and it can limit movement of the swinging piece, so that the swinging piece is located at the first swinging position; under the action of external force, the limiting pin is switchable between the second matching position and a third matching position where the limiting pin is plugged in the external power supply.

In one embodiment, the base is provided with a second storage slot, a free end of the limiting pin is received in the second storage slot when it is at the first matching position; the free end of the limiting pin is disposed outside the second storage slot when it is at the second matching position; the position of the second storage slot is corresponding to the position of the limiting groove.

In one embodiment, a free end of the limiting pin is provided with a slot, when the limiting pin is at the first matching position and the limiting mechanism is at a limiting position, the limiting mechanism is plugged into the slot; the limiting mechanism further moves out of the slot when the limiting mechanism is at an unlocking position.

In one embodiment, the limiting mechanism comprises a push button and an elastic piece; the push button has the limiting position and the unlocking position; the elastic piece is capable of applying an elastic force on the push button and leading it to move towards the limiting position when the push button is at the unlocking position.

In one embodiment, the power adapter further comprises a replaceable plug detachably connected to the base.

In second embodiments, the present application further discloses an electronic connector that comprises the power adapter as described above.

In one embodiment, the electronic connector further comprises an electric wire and a connecting seat, one end of the electric wire is connected to the base and is electrically connected with the plug-in mechanism and the other end is electrically connected to the connecting seat, the connecting seat is capable of electrically connecting with the external adapter.

In one embodiment, the connecting seat comprises a guide plate and a plug-in piece connected to the guide plate, the guide plate has a guide surface, the plug-in piece is set on the guide surface and capable of plugging in and matching with the external adapter to electrically connect with the external adapter; the guide surface is capable of limiting relative rotation between the guide plate and the external adapter.

In one embodiment, the connecting seat further comprises a first sliding structure carried on the plug-in piece and/or a second sliding structure carried on the guide plate; the first sliding structure and the second sliding structure are both slidably connected with the external adapter.

In one embodiment, the connecting seat further comprises a clamping structure carried on the guide plate and capable of being clamped with the external adapter.

Compared with the prior art, the technical effects of the present application are as follows: the power adapter is provided with the swinging piece rotating around the axis of the plug body and the reset mechanism connected to the swinging piece, the swinging piece can be set smaller, the reset mechanism connected to the swinging piece reduces the space occupied by the reset mechanism, meanwhile, the circular motion of the swinging piece around the axis of the plug body applies a certain torque to the swing piece, which reduces the force needed to be applied by the reset mechanism for driving the body pin to rotate, that is, the reset mechanism does not need to exert a large force to drive the body pin to rotate, thus the size of the reset mechanism can be set smaller, further reducing the volume needed to realize the rotation of the plug-in mechanism, and then reducing the overall dimension of the power adapter, therefore the power adapter is more convenient to carry.

BRIEF DESCRIPTION OF THE DRAWINGS

In order to clearly illustrate the technical solution of the embodiments of the present application, the embodiments of the present application or the accompanying drawings to be used in the description of the prior art will be briefly described in detail, and it is obvious that the drawings described below are only some embodiments of the present application, without paying the creative labor, other drawings are perceived according to the following drawings.

DESCRIPTION OF THE DRAWINGS

Figure 1:
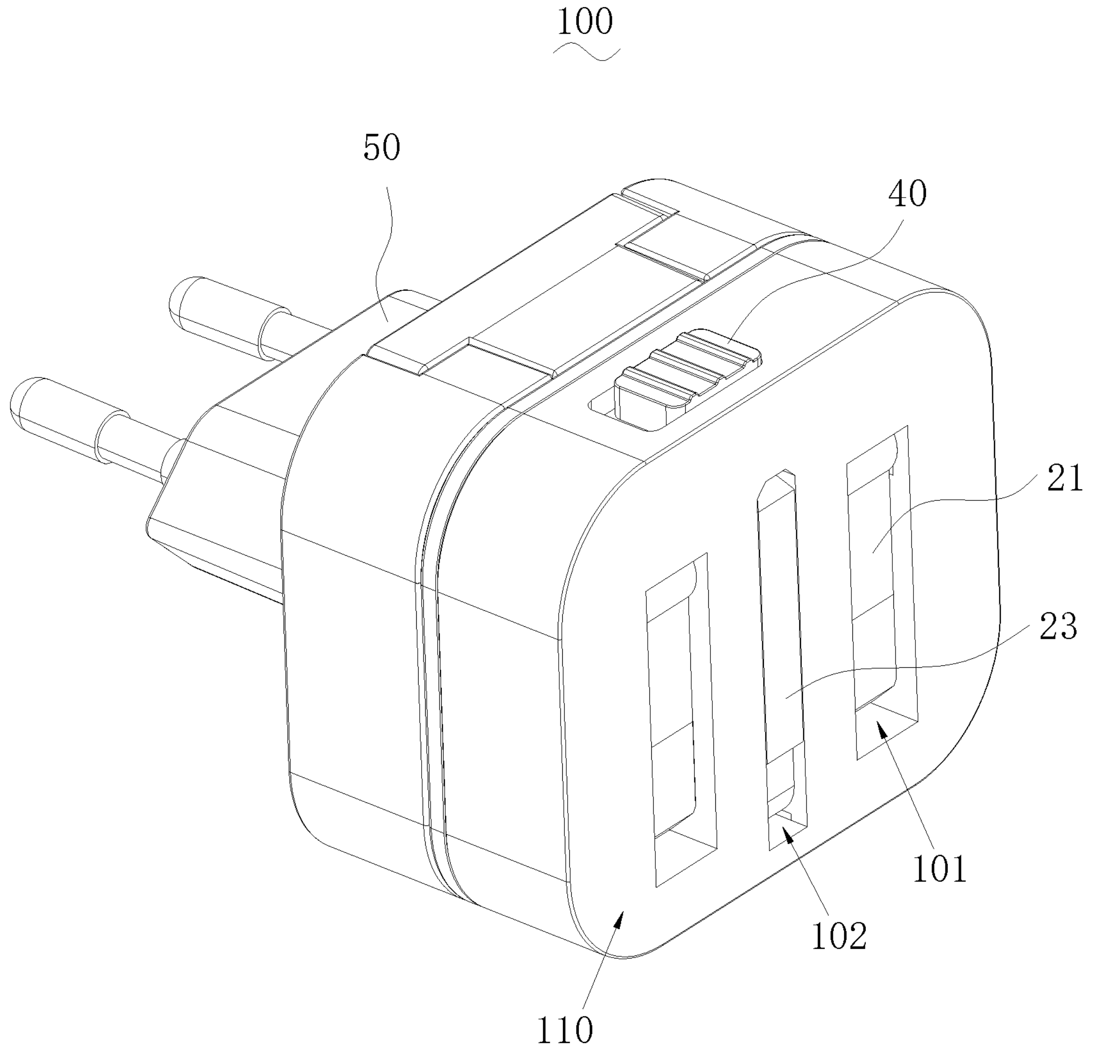
FIG. 1 is a perspective view of a power adapter according embodiments of the present application.

100. an power adapter; 10, a base; 101, a first storage slot; 102, a second storage slot; 103, a slideway; 11, an upper shell; 110, a mounting surface; 12, a lower shell; 13, a plug-in seat; 20, a plug-in mechanism; 21, a plug body; 210, a limiting slot; 211, a rotating shaft; 2111, a rotating part; 2112, a limiting part; 212. a body pin; 22, a swing piece; 23, a limiting pin; 230, a slot; 30, a reset mechanism; 31. a reset piece; 32. a sliding piece; 40, a limiting mechanism 41, a push button; 411, a baffle; 42. an elastic piece; 50, a replaceable plug;

200. a connecting seat; 61. a guide plate; 610. a guide surface; 62. a plug-in piece; 621, a plug-in block; 6210, a plug-in groove; 622, a first sliding structure; 623. a second sliding structure; 624, a clamping structure; 300 a connecting wire; 90, an external adapter; 901, a mounting groove; 91. a shell; 911, a first side surface; 912. a second side surface; 92. a rotatable plug.

DETAILED DESCRIPTION

The embodiments of the present application will be described in detail below, examples of which are shown in the accompanying drawings, of which, the same or similar reference numerals indicate same elements or alike elements having the same or similar function from the beginning to the end. The following embodiments are described with reference to the accompanying drawings, which are intended to be used to explain the present application, and not to be construed as limiting the present application.

In the description of the present application, to be understood, the term “inner”, “outer” and other indicating orientation or position relationship according to the accompanying drawings, is only for the purpose of describing the invention and simplifying the description, and not to indicate or imply that the devices or elements must have a specific orientation, a specific orientated structure and operation. It is not to be understood as limiting the present application.

In addition, the term “first”, “second” and “third” are used only for the purpose of description, and cannot be construed as indicating or implying relative importance or implicitly indicating the number of technical features. Thus, defining a "first", "second" and "third" characteristic can indicatively or implicitly comprise one or more of the features. In the description of the present application, the meaning of "a plurality of" is two or more than two, otherwise, specific definition is required.

In the present application, unless otherwise specified and defined, the term "installation", "connected", "connected", "fixed" and the alike terms should be broadly construed, for example, to be construed as fixed connection, detachably connected, or integrally formed, also mechanical connected, also electrically connected, also directly connected, also indirectly connected through intermediate mediums, also inner communicated or interacted between two elements two elements. For those of ordinary skill in the art, the specific meaning of the terms in the present application can be understood in context.

In order to make the purpose that the technical solution and advantages of the present application are more clearly understood, following combinations of drawings and embodiments are further explained in detail.

Figure 2:
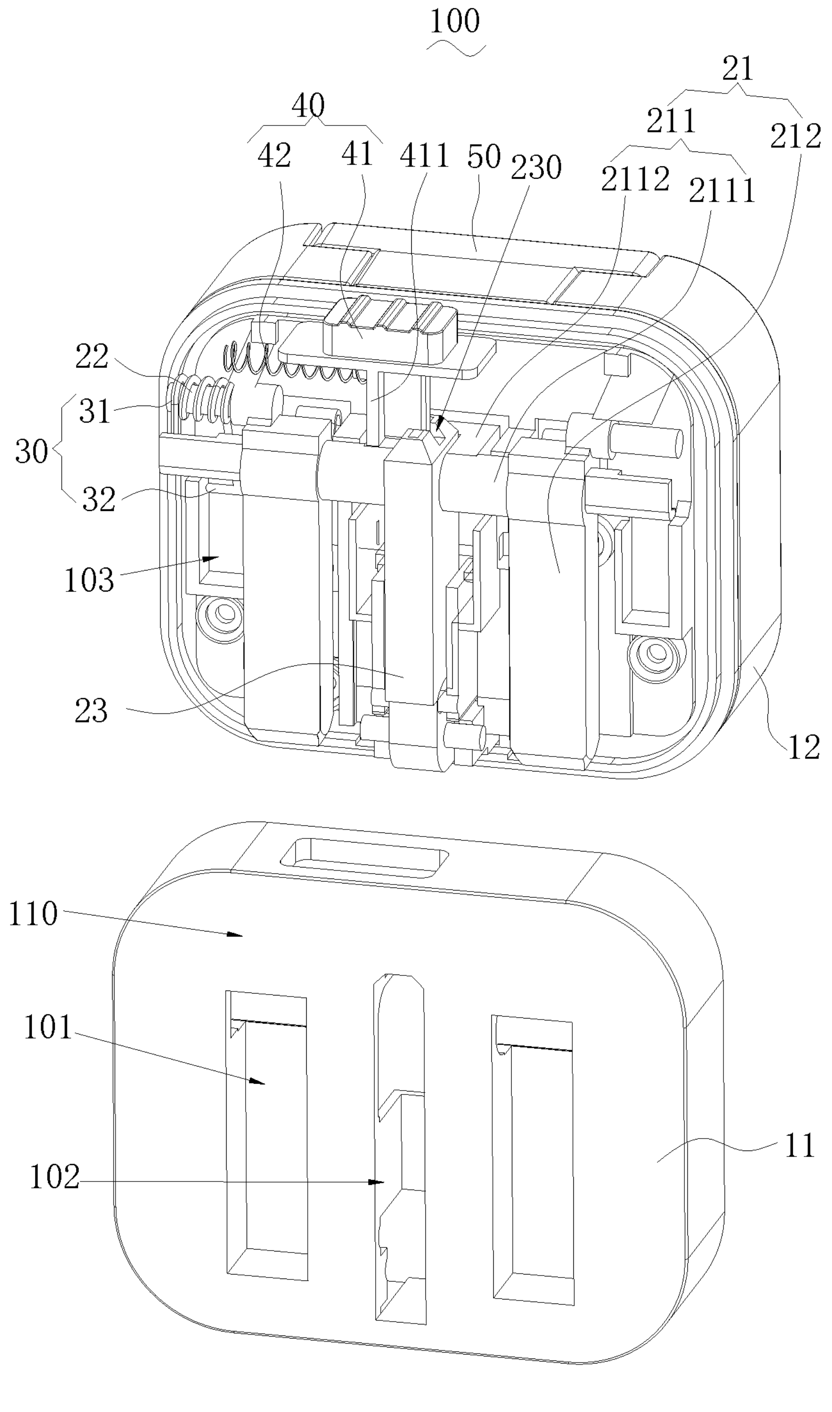
FIG. 2 is a partial exploded view of one view of the power adapter in FIG. 1, the swing member is at the first swing position thereof.

Referring to FIG. 1 and FIG. 2, embodiments of the present application provide a power adapter 100 comprising a base 10, a plug-in mechanism 20, a reset mechanism 30 and a limiting mechanism 40.

Referring to FIG. 1 and FIG. 2, the base 10 has a mounting surface 110, the base 10 is provided with a first storage slot 101 and a second storage slot 102 on the mounting surface 110, the first storage slots 101 are provided with two and two first storage slots 101 are parallel and arranged at intervals with each other, the second storage slot 102 is disposed between the two first storage slots 101 and parallel to the first storage slots 101; the base 10 has a mounting cavity therein, walls of the first storage slots 101 are opened with a switch hole communicating with the mounting cavity, the second storage slot 102 is communicating with the mounting cavity. The base 10 has an upper shell 11 and a lower shell 12 snapped with the upper shell 11, the upper shell 11 and the lower shell 12 are snapped together to form a mounting cavity.

Figure 3:
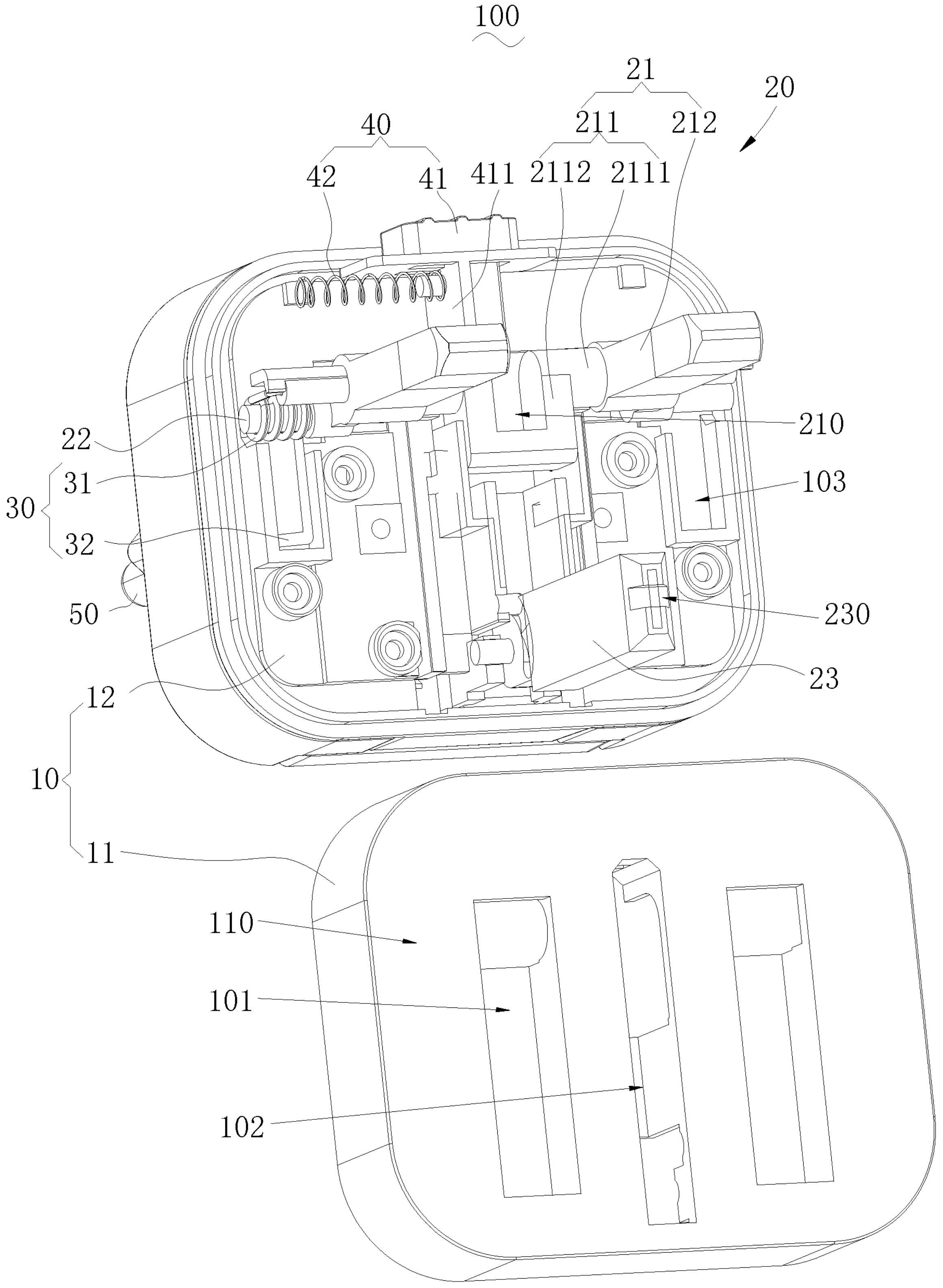
FIG. 3 is a partial exploded view of another view of the power adapter in FIG. 1, the swing member is at the second swing position thereof.

Referring to FIG. 2 and FIG. 3, the plug-in mechanism 20 comprises a plug body 21 rotatably connected to the base 10, and a swinging piece 22 connected to the plug body 21 and disposed in the mounting cavity; the swinging piece 22 is capable of circular motion of rotating around an axis of the plug body 21 to drive the plug body 21 to rotate, the swinging piece 22 is switchable between a first swinging position and a second swinging position through circular motion, the plug body 21 is electrically connected with at least one external power supplies when the swinging piece 22 is at the second swinging position; the plug body 21 can be stored in the first storage slot 101 when the swinging piece 22 is at the first storage position, so as to reduce occupied space by the power adapter 100 when it is not used. Of which, the plug body 21 is located below the mounting surface 110 while it is stored in the first storage.

Referring to FIG. 2 and FIG. 3, specifically, the plug body 21 comprises a rotating shaft 211 rotatably connected to the base 10, and a plug pin 212 connected to the rotating shaft 211. The swinging piece 22 is connected to the rotating shaft 211, the body pin 212 is capable of electrically connecting with the external power supply when the swinging piece 22 is at the second swinging position, of which, the rotating shaft 211 is rotatably connected within the switch hole, extending into the mounting cavity; the body pin 212 may be a pin in compliance with England standard, US standard or European standard. In this embodiment, the swinging piece 22 and the body pin 212 are not on an identical straight line, namely an angle less than 180 degrees formed between the swinging piece 22 and the main body pin 212; the body pins 212 are provided with two, namely the plug body 21 is a two-pin plug. Two body pins 212 are respectively stored in the first storage slots 101 when the swinging piece 22 is at the first swinging position, therefore the plug body 21 can be retracted when it is not in use to reduce its occupied space so as to be convenient to carry. When the swing piece 22 is at the second swing position, free ends of two body pins 212 are located outside the first storage slots 101, preferably, two body pins 212 are perpendicular with the mounting surface 110 when the swing piece 22 is at the second swing position, which is convenient to be plugged into the external power supply. In some embodiments, the external power supply is a socket.

In some embodiments, the swinging piece 22 comprises a connecting part connected to the rotating shaft 211, and a swinging part connected to the connecting part and spaced with the rotating shaft 211; the swinging part is parallel to a central axis of the rotating shaft 211, a diameter of the swinging part is less than the diameter of the rotating shaft 211.

Referring to FIGS. 2 and 3, the reset mechanism 30 is connected to the swing piece 22 and the base 10. The reset mechanism 30 is capable of applying a reset force to the swing piece 22 and leading the swing piece 22 to move towards the second swing position when the swing piece 22 is at the first swing position. To be understandable, the body pins 212 can be rotated and retracted into the first storage slots 101 under the external force, causing the swinging piece 22 to move from the second swinging position to the first swinging position, at this time, the reset mechanism 30 has a reset force. When the external force is removed, the reset mechanism 30 releases the reset force, the swing piece 22 is moved from the first swing position to the second swing position under the drive of the reset force. In this embodiment the reset force is an elastic force, in other embodiments the reset force is an electric force, a magnetic attraction force and so on.

Referring to FIG. 1 and FIG. 2, the limiting mechanism 40 has a limiting position and an unlocking position, the limiting mechanism 40 is at the limiting position where limits the swinging piece 22 to move when the first the swinging piece 22 is at the swinging position, and the limiting mechanism 40 is at the unlocking position where releases the limiting of the swinging piece 22, thus the reset mechanism 30 releases the reset force. The limiting mechanism 40 is able to directly act on the plug-in mechanism 20, also able to indirectly act on the plug-in mechanism 20 by using other structures, so as to limit the movement of the swinging piece 22 or release the limiting of the swinging piece 22.

The power adapter 100 is provided with the swinging piece 22 capable of rotating around the axis of the plug body 21 and the reset mechanism 30 connected with the swinging piece 22. The swinging piece 22 can be adjusted to be smaller, the space occupied by the reset mechanism 30 is reduced accordingly since the reset mechanism 30 is connected to the swinging piece 22. Meanwhile, a certain torque applied to the swing piece 22 by the rotation movement of the swinging piece 22 around the rotating shaft 211 of the body plug 21, reduces a force for the reset mechanism 30 driving the body pin 212 to rotate, that is, the reset mechanism 30 exert a comparatively smaller force to drive the body pin 212 to rotate, therefore, the size of the reset mechanism 30 is smaller, further the inner space occupied by the reset mechanism 30 for driving the body plug 21 to rotate, then reducing the overall dimension of the power adapter 100 which means that the power adapter 100 is convenient to carry.

Referring to FIG. 2 and FIG. 3, in the embodiments, the reset mechanism 30 comprises a reset piece 31 connected to the swinging piece 22, and a sliding piece 32 connected to the reset piece 31, the sliding piece 32 is slidably connected to the base 10 and slidable between a first sliding position and a second sliding position thereon. The reset piece 31 exerts a reset force to the swinging piece 22 and leading the swinging piece 22 to move towards the second swinging position when the swinging piece 22 is at the first swinging position. The reset piece 31 can release the reset force to drive the swinging piece 22 to move from the first swinging position to the second swinging position, and to drive the sliding piece 32 to move from the first sliding position to the second sliding position. To be understandable, the swinging piece 22 keeps performing the circular motion, which drives the sliding piece 32 move back and forth from the first sliding position to the second sliding position, when the sliding piece 32 is at the first sliding position, the reset piece 31 stores energy owning a reset force, when the reset piece 31 releases the reset force, the sliding piece 32 is moving from the first sliding position to the second sliding position. The sliding movement of the sliding piece 32 can limit the circular movement, while, the base 10 acts on the sliding piece 32 with guiding and limiting effects. Preferably, the base 10 is provided with a slideway 103 carried on the wall of the mounting cavity, the slideway 103 extends along a direction of the first storage slot 101, the sliding piece 32 is slidably connected to the slideway 103 capable for limiting the sliding piece 32 to move along the axial direction of the rotating shaft 211, and preventing the torsion spring departing from the swing part.

In this embodiment, the reset piece 31 is a torsion spring, the torsion spring is sleeved on the rotating shaft 211, specifically sleeved on the swinging part, one end of the torsion spring is connected to the body plug 21 and the other end is connected to the sliding piece 32, the base 10 acts on the sliding piece 32 to limit it: preventing the sliding piece 32 to rotate, in this circumstances, when the swinging piece 22 moves from the first swinging position to the second swinging position, the reset piece 31 rotates as well, since the sliding piece 32 cannot rotate due to being blocked by the base 10, the torsion spring is twisting to generate a torque force. Of which, the torsion spring is connected to one end of the body plug 21, specifically connected to the rotating shaft 211. It should be noted that a distance between an area of the sliding piece 32 and the base 10 connected is larger than a distance between the base 10 and the swinging piece 22 when the swinging piece 22 is at the second swinging position, so that the torque force generated by twisting of the torsion spring is positively related to the distance.

Figure 4:
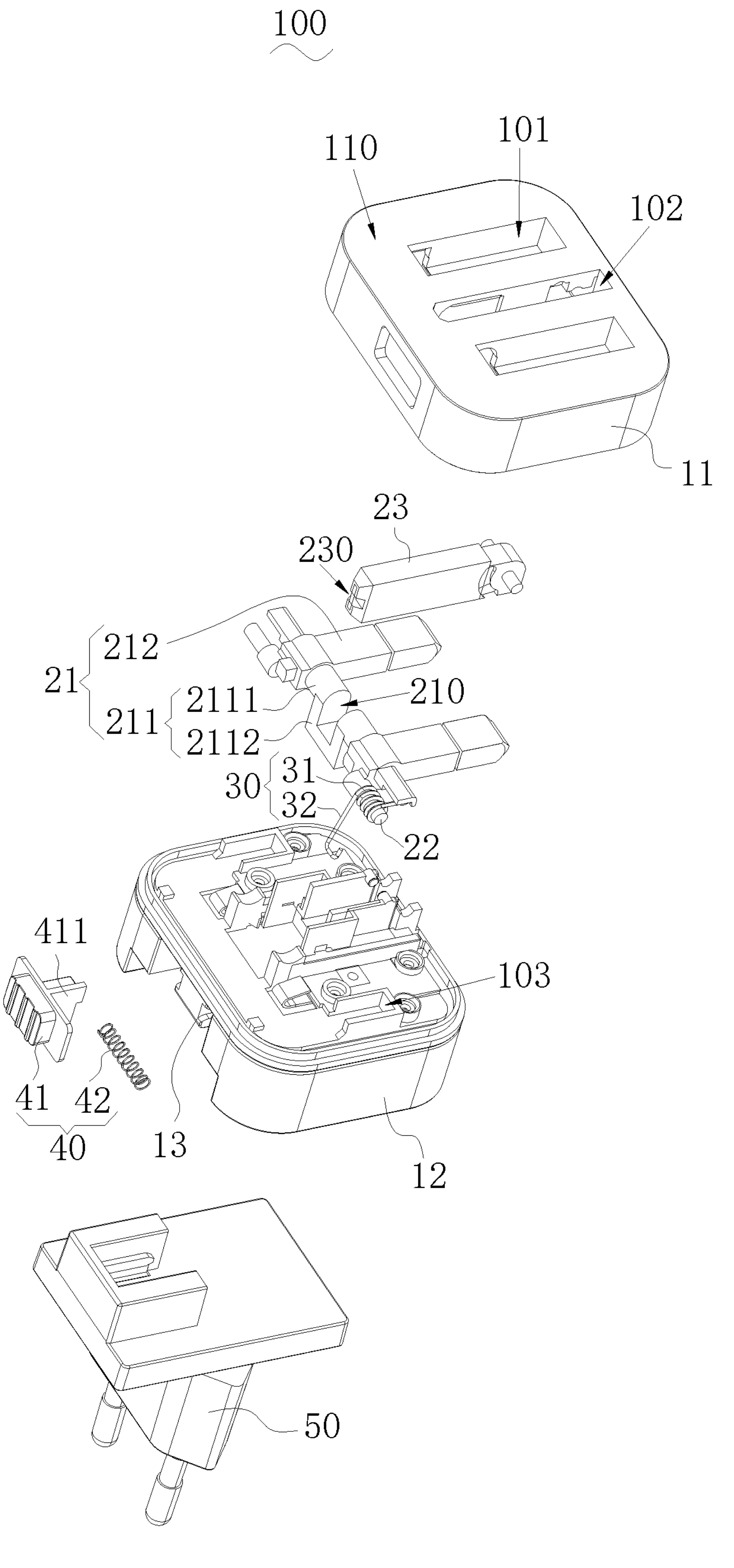
FIG. 4 is an exploded view of the power adapter in FIG. 1.

Referring to FIG. 2 to FIG. 4, the rotating shaft 211 includes a rotating part 2111 rotatably connected to the base 10 and a limiting part 2112 connected to the rotating part 2111, the limiting part 2112 is located in a containing cavity and is opened with a limiting slot 210, two ends of the limiting slot 210 are set extending through; the limiting part 2112 is U-shaped and protrudes out from a side wall of the rotating part 2111 along an opening direction of the limiting slot 210, the protruding direction of the limiting part 2112 and the extending direction of the body pin 212 may form an included angle of 90 degrees. When the body pin 212 is stored in the first storage slot 101, the limiting part 2112 extends away from the mounting surface 110. Of which, the rotating parts 2111 are provided with two, the body pin 212 is connected to the rotating part 2111, the limiting part 2112 is located between the two rotating parts 2111. In this way, the limiting part 2112 and the second storage slot 102 are corresponding to each other; the limiting slot 210 and the second storage slot 102 are corresponding to each other.

Referring to FIG. 2 and FIG. 3, in order to realize a plug-in connection between the power adapter 100 and the three-pin power supply, in the embodiment, the plug-in mechanism 20 further comprises a limiting pin 23 rotatably connected to the base 10; the limiting pin 23 can rotate to at least partially stored at a first matching position in the limiting slot 210; when the swinging piece 22 moves from the first swinging position to the second swinging position, the limiting part 2112 may drive the limiting pin 23 to rotate from the first matching position to the second matching position, a free end of the limiting pin 23 is disposed outside the second matching position when the limiting pin 23 is at the second matching position. The limiting pin 23 can be rotated from the second matching position to the first matching position under an external force, to drive the limiting part 2112 to rotate, and to drive the swinging member 22 move from the second swinging position to the first swinging position. The free end of the limiting pin 23 can be located outside the second storage slot 102 when the limiting pin 23 is at the second matching position. The limiting pin 23 under an external force rotates from the second matching position to the first matching position to push the limiting part 2112 to rotate, and to cause the swinging piece 22 to move from the second swinging position to the first swinging position. The free end of the limiting pin 23 can be received in the second storage slot 102 when the limiting pin 23 is at the first matching position, at this time, the limiting pin 23 limits the movement of the swinging piece 22 and keeps the swinging piece 22 at the first swinging position, the limiting pin 23 under the external force rotates from the second matching position to a third matching position where the limiting pin 23 is plugged into the external power supply. It is understandable that the limiting pin 23 can be switched in turn among the first matching position, the second matching position and the third matching position, when the limiting pin 23 is at the third matching position and the swinging piece 22 is at the second swinging position, the limiting pin 23 and two body pins 212 constructs a three-pin plug for matching a three-pin power supply. The swinging piece 22 under the reset force from the reset mechanism 30 moves from the first swinging position to the second swinging position, the limiting part 2112 rotates and drives the limiting pin 23 to move from the first matching position to the second matching position, at this time, the free end of the limiting pin 23 is rotated out of the second storage slot 102, the user has to manually rotate the limiting pin 23 to the third matching position and thus the power adapter 100 can be plugged into the external power supply. The limiting pin 23 can move from the second matching position to the first matching position under the action of the external force, the limiting pin 23 pushes the limiting part 2112 to rotate so as to make the body pin 212 and the swinging part to rotate, when the limiting pin 23 is located inside the second storage slot 102, the body pin 212 is located inside the first storage 101.

Referring to FIG. 2, preferably, when the limiting pin 23 is at the first matching position, a side wall thereof is abutting against a bottom of the limiting slot 210, the limiting pin 23 and the limiting part 2112 contact in surface to prevent the body plug 21 from shaking. When the limiting pin 23 is at the second matching position, it separates from the bottom of the limiting slot 210, the limiting pin 23 can still abut against the limiting part 2112 but a side corner of the limiting pin 2112 pushes the free end of the limiting pin 23 out of the second storage slot 102. More preferably, when the limiting pin 23 is at the first matching position, the side wall of the free end thereof is abutting against the bottom of the limiting slot 210, so as to increase the torque and reduce a force for the driving limiting pin 23 to rotate.

Referring to FIG. 2, the free end of the limiting pin 23 is provided with a slot 230, when the limiting pin 23 is located at the first matching position and the limiting mechanism 40 is located at the limiting position, the limiting mechanism 40 can be plugged into the slot 230. The limiting mechanism 40 can also move out of the slot 230 when it is at the unlocking position, such that the limiting mechanism 40 can realize the limitation of the body plug 21 by being plugged with the limiting pin 23, such that the swinging piece 22 can be limited at the first swinging position, and the main body pin 212 is stored in the first storage slot 101, the limiting pin 23 is stored in the second storage slot 102. When the limiting mechanism 40 moves to the unlocking position, the reset mechanism 40 releases the limitation of the limiting pin 23, and releases the limitation of the main body plug 21 as well, the swinging piece 22 moves to the second swinging position under the reset force of the reset mechanism 30, at this time, the free end of the limiting pin 23 also moved out of the second storage slot 102, such that the power adapter 100 may realize storage, limiting and releasing of the plug-in mechanism 20 through the limiting mechanism 40.

Referring to FIG. 2 and FIG. 3, specifically, the limiting mechanism 40 comprises a push button 41 and an elastic piece 42, the push button 41 has a limiting position and an unlocking position, the elastic piece 42 may exert an elastic force to the push button 41 and lead the push button 41 to the limiting position when the push button 41 is at the unlocking position. The elastic piece 42 is a spring and located at a side of the push button 41, of which the side is from the limiting position toward the unlocking position, the top of the push button 41 has a skid-proof structure that is convenient for the user to move the push button 41. Of which, the push button 41 is further provided with a baffle 411, the baffle 411 can be propped against the limiting pin 23 when the push button 41 is plugged with the limiting pin 23, so as to limit the push button 41 at the limiting position and avoid the push button 41 keeps moving out of the slot 230 under the elastic force of the elastic piece 42. Preferably, the push button 41 after removing the external force can be reset to the limiting position under the elastic force of the elastic piece 42, the free end of the limiting pin 23 has a guide surface, when the limiting pin 23 is at the second matching position and moves towards the first matching position; the guide surface is propped against the push button 41 and can push the push button 41 towards the unlocking direction; when the limiting pin 23 moves to the first matching position, the push button 41 under the elastic force of the elastic piece 42 is plugged into the slot 230, and moves to the limiting position.

When the user needs to use the power adapter 100, the user pushes the push button 41 from the limiting position to the unlocking position, the swinging piece 22 under the reset force of the reset piece 31 moves from the first swing position to the second swing position, the swinging piece 22 drives the rotating shaft 211 to rotate, the free end of the body pin 212 moves out of the first storage slot 101, the limiting part 2112 rotatably pushes the limiting pin 23 to rotate from the first matching position to the second matching position, at this time the free end of the limiting pin 23 is located outside the second storage slot 102, the user manually moves the limiting pin 23 from the second matching position to the third matching position, that is, the user only needs to push the push button 41 and rotate the limiting pin 23 to realize the power adapter 100 is unfolded.

When the power adapter 100 is not used, the user through the external force rotates the limiting pin 23 to cause the limiting pin 23 to move from the third matching position to the second matching position. Since the swinging part is located at the second swinging position, between the body pin 212 and the mounting surface 110 is 90 degrees. The protruding direction of the limiting part 2112 is an extending direction of the second storage slot 102, the limiting pin 23 at the second matching position is propped against the limiting part 2112 of the rotating shaft 211, continuously rotating the limiting pin 23, the limiting pin 23 pushes the limiting part 2112 to rotate, until a side wall of the free end of the limiting pin 23 is abutting against the slot bottom of the limiting slot 210, the limiting pin 23 is stored in the second storage slot 102 and partially received in the limiting slot 210, the protruding direction of the limiting part 2112 is opposite to the mounting surface 110, namely, the opening direction of the limiting slot 210 faces the second storage slot 102, the push button 41 under the elastic force of the elastic piece 42 from the unlocking position to the limiting position, and it is plugged with the limiting pin 23, to limit the movement of the limiting pin 23. The rotation of the limiting part 2112 drives the rotating part 2111 to rotate, the rotating part 2111 drives the swinging part to move from the second swinging position to the first swinging position, the body pin 212 is stored in the storage slot 101, the swinging piece 22 from the second swinging position to the first swinging position, the sliding piece 32 moves from the second sliding position to the first sliding position and reset piece 31 stores energy.

Figure 5:
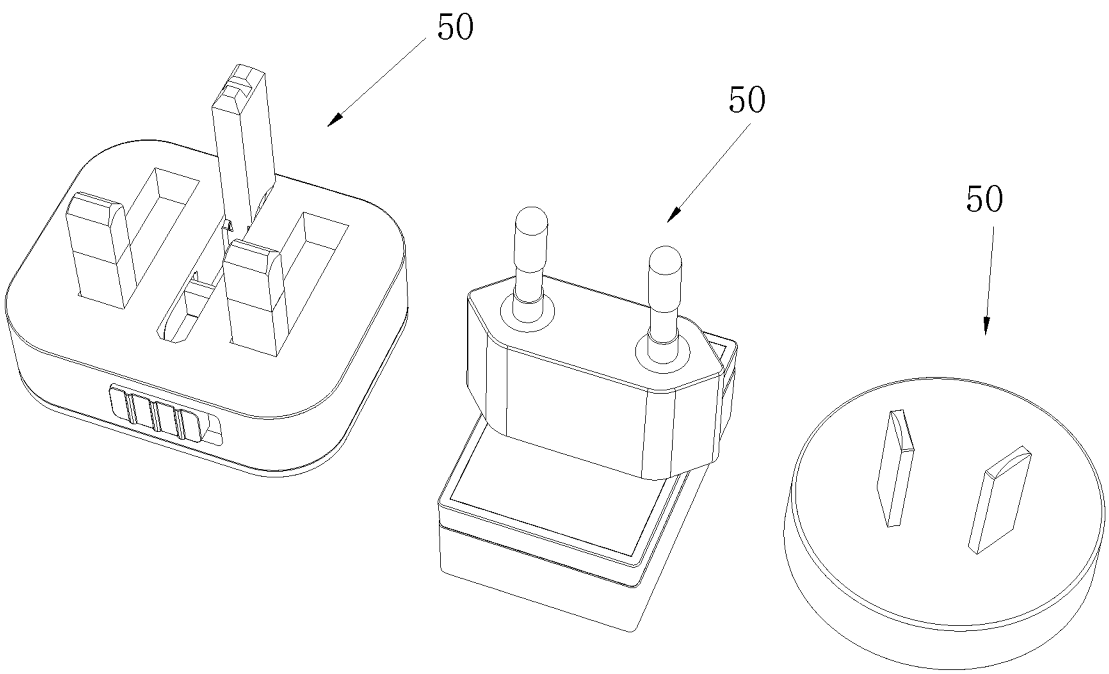
FIG. 5 is a perspective view of a replaceable plug in an electronic connector according to embodiments of the present application.

Referring to FIG. 4 and FIG. 5, to realize the electrical connection with multifunctional application, the power adapter 100 further comprises a replaceable plug 50 detachably connect to the base 10. The replaceable plug 50 can increase application range of the electrical connection, the replaceable plug 50 may be various types of replaceable plugs matched with the plug-in mechanism 20. The power adaptor 100 is also provided with electrical wires, by which, the plug-in mechanism 20 and the replaceable plug 50 are electrically connected. In an embodiment, the replaceable plugs 50 are provided with at least two, the at least two replaceable plugs 50 can be set with different types to satisfy the user's different needs.

Referring to FIG. 4, to conveniently assemble the replaceable plug 50, the base 10 is provided with a plug-in seat 13, the electrical connection between the replaceable plug 50 and the electrical wire is realized by the plug-in seat 13 plugged with the replaceable plug 50.

Figure 6:
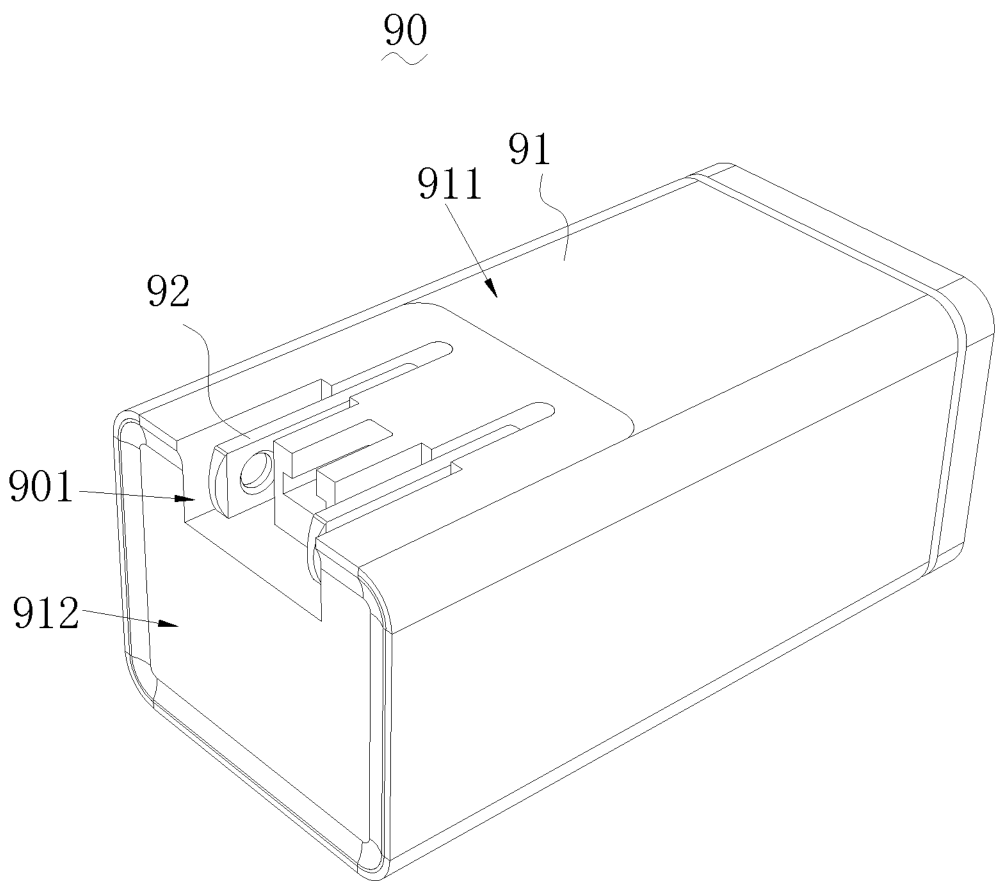
FIG. 6 is a perspective view of an external power adapter according to embodiments of the present application.
Figure 7:
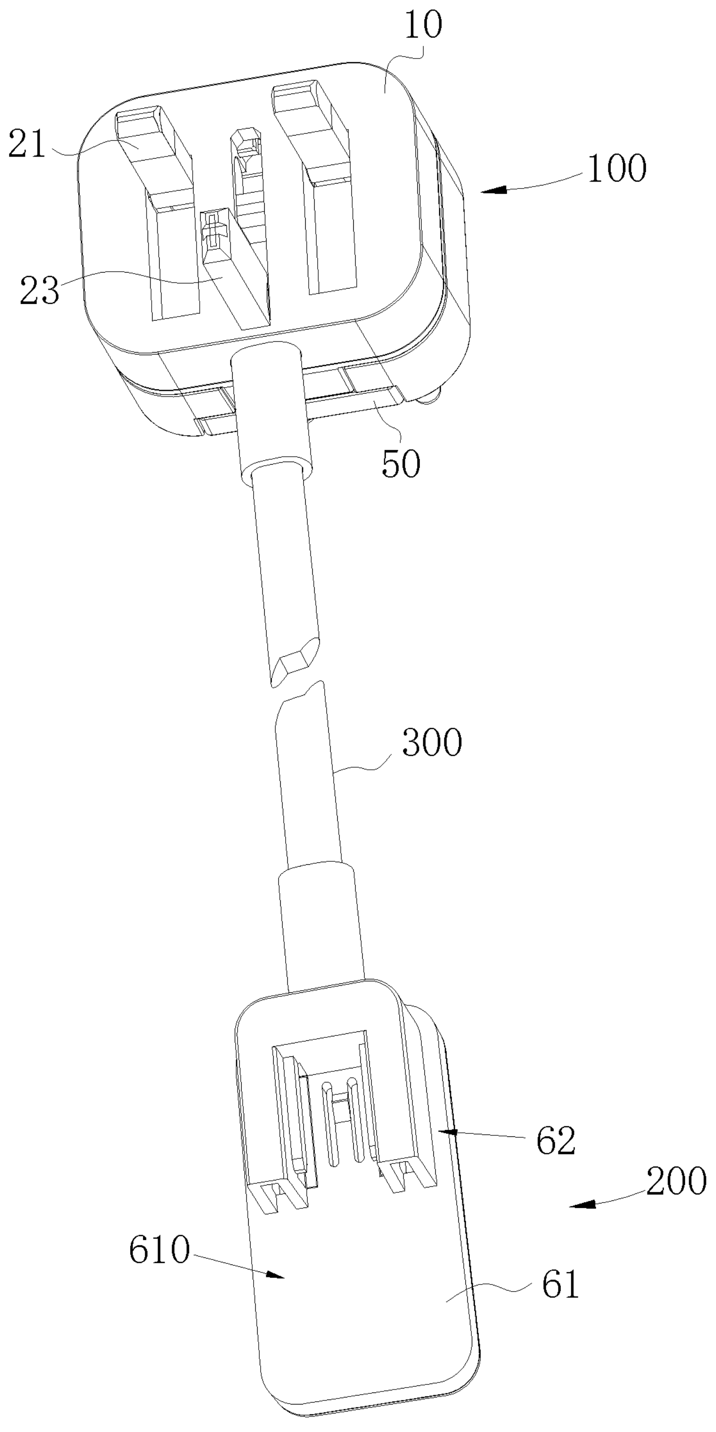
FIG. 7 is a perspective view of the electronic connector according to embodiments of the present application.
Figure 9:
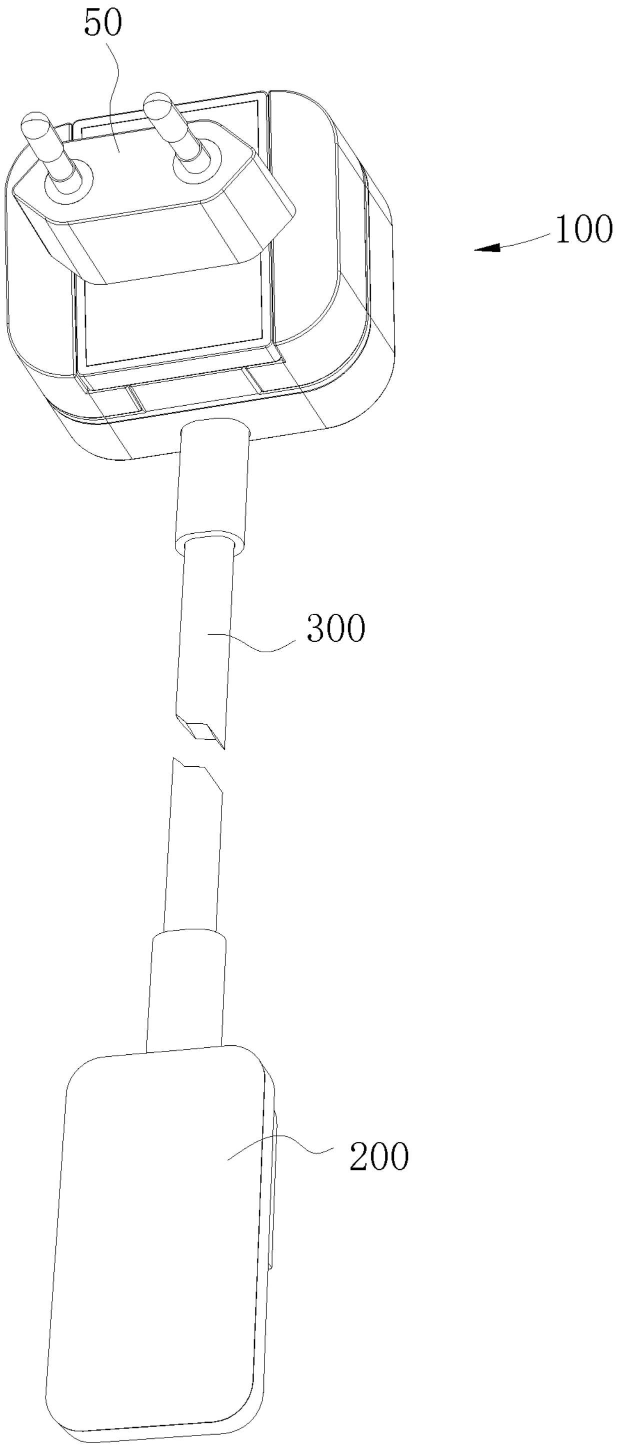
FIG. 9 is a perspective view of another perspective view of the electronic connector in FIG. 7.

Referring to FIG. 7 and FIG. 9, the present application further provides an electronic connector comprising the aforementioned power adapter 100, a connecting seat 200 and a connecting wire 300. The electrical connector is used for electrically connecting with an external adapter 90 and an external power source. Referring to FIG. 6, the external adapter 90 includes a shell 91 and a rotatable plug 92 rotatably connected to the shell 91. The rotatable plug 92 is capable of switching from a connection position and a hidden position by rotation, the shell 91 is provided with a mounting groove 901. The rotatable plug 92 is rotatably connected to a groove wall of the mounting groove 901, the rotatable plug 92 at the hidden position is received in the mounting groove 901, and the rotatable plug 92 at the connection position is vertical with a groove bottom of the mounting groove 901 so as to abut the external power supply. The shell 91 is generally block-shaped, the mounting groove 901 is opened through the first side surface 911 and the second side surface 912 of the shell 91, the rotatable plug 92 is set on the first side surface 911, when the rotatable plug 92 is at the hidden position, the free end thereof faces the second side surface 912. Of which, the external power supply can be a fixed socket.

Figure 8:
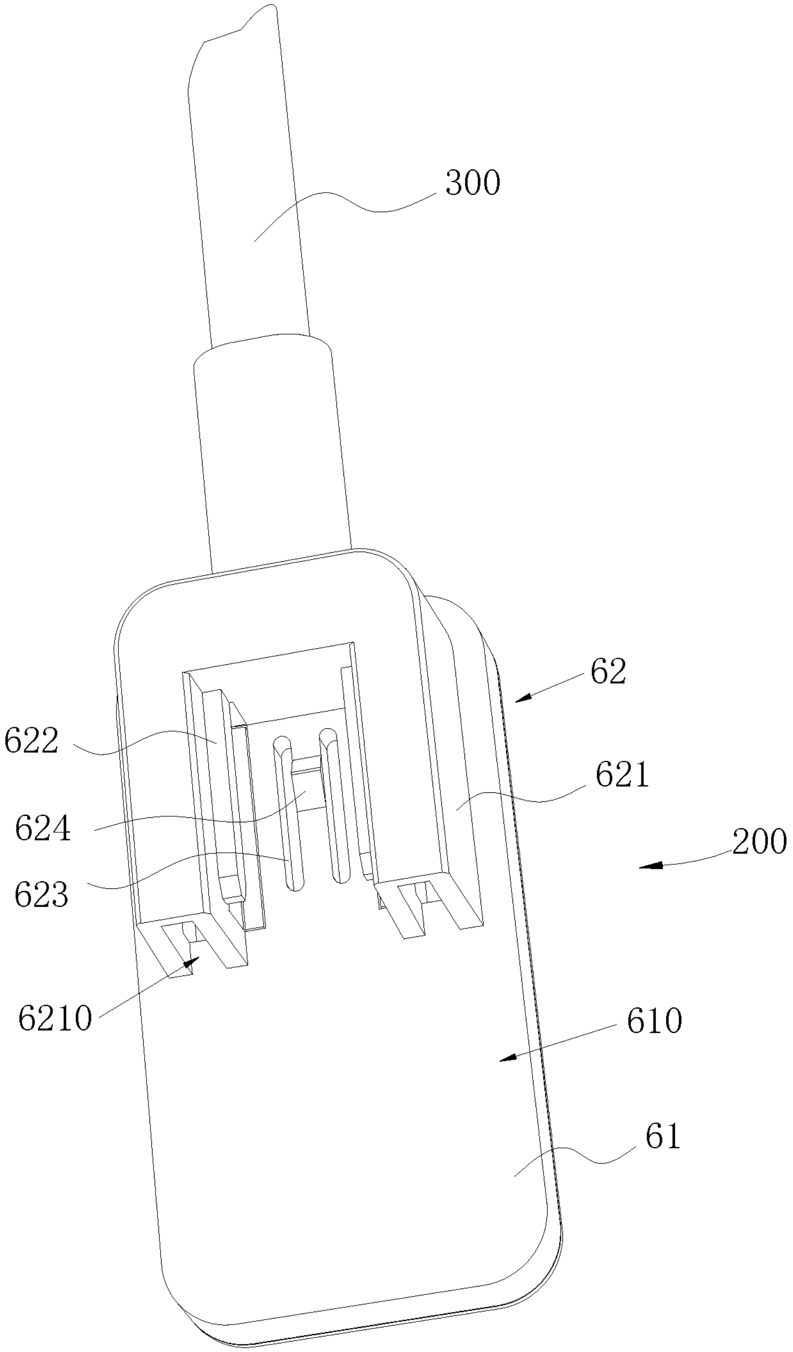
FIG. 8 is a partial enlarged view of the electronic connector in FIG. 7.

Referring to FIG. 8, the connecting seat 200 comprises a guide plate 61, a plug-in piece 62 connected to the guide plate 61, a control plate connected to the guide plate 61 and an elastic sheet connected to the control plate. The plug-in piece 62 is configured for being plugged with the external adapter 90. To be understandable, when the rotatable plug 92 is at the hidden position, a plug-in direction of the plug-in piece 62 is the same as the second side surface 912 facing the rotatable plug 92, the guide plate 61 has a guide surface 610 matched with one surface of the shell 91, the guide surface 610 is used for limiting the guide plate 61 to rotate relatively to the external adapter 90. The aforementioned one surface may be the first side surface 911 of the shell 91, in other embodiments, and may also be other side surfaces. The guide surface 610 is used for abutting against the shell 91 to limit the rotation of the rotatable plug 92. That is, when the rotatable plug 92 is plugged into the connector 62, the guide surface 610 abuts against the first side surface 911 to limit the rotatable plug 92 to rotate towards the connection position. Preferably, the plug-in piece 62 is set on the guide surface 610, so that the guide surface 610 and the first side surface 911 abutting against each other, increasing the abutting area between the guide surface 610 and the shell 91 and enhancing the limiting effect.

The guide plate 61 has a containing cavity, the control plate is set in the containing cavity. Of which, the control plate is a printed circuit board, the elastic sheet is an elastic metal sheet.

The connecting wire 300 is able to conduct electricity, one of which is connected to the connecting seat 200 and the other end is connected to the connector, so that the plug-in piece 62 is electrically connected with the connecting seat 200. Of which, the control board is electrically connected with the connecting wire 300.

The connecting seat 200 of the electronic connector can be electrically connected with the external adapter 90 to realize the electric connection, the connector can be electrically connected with the external power supply. By utilizing the connecting wire 300 the connecting seat 200 and the connector are electrically connected with each other, such that if the electric wire of the electronic device is not long enough, the electronic connector may be used to connect the external power supply and the power adapter 100 that is connected with electric devices, so as to have functions of prolonging electric wires, enlarging the application range of the electronic devices, and improving convenience for users to use the electronic devices.

Referring to FIG. 8, specifically, the plug-in piece 62 comprises a plug-in block 621 for being inserted with a rotatable plug 92, the control circuit board is capable of electrically connecting with the rotatable plug 92 when the plug-in block 621 is inserted with the rotatable plug 92. The plug-in piece 62 comprises a plug-in block 621, two pins of the rotatable plug 92 are both plugged into the plug-in block 621. In the embodiment, the plug-in piece 62 includes two plug-in blocks 621, two plug-in blocks 621 are parallel and spaced, two pins of the rotatable plug 92 each are plugged into one plug-in block 621.

Referring to FIG. 8, preferably, the plug-in block 621 is provided with a plug-in groove 6210 connected with the containing cavity and matched with the rotatable plug 92, the plug block 621 can be inserted and matched with the rotatable plug 92 when the rotatable plug 92 is inserted into the plug groove 6210. The inserting groove 6210 plays limiting and guiding roles on the rotatable plug 92. The rotatable plug 92, inserted in the plug-in groove 6210 can be electrically connected with the control circuit board.

Specifically, an elastic sheet is extending from the containing cavity to the plug-in groove 6210, the elastic sheet can be abutting against the rotatable plug 92 when the rotatable plug 92 is inserted into the plug-in groove 6210, and can be electrically connected with the rotatable plug 92 when it is abutting against the rotatable plug 92. The elastic abutting maintains abutting state under a certain error range between the elastic sheet and the rotatable plug 92, avoiding loose contact between the elastic sheet and the rotatable plug 92.

Referring to FIG. 8, to further limit separation of the electronic connector and the external adapter 90, the connecting seat 200 further comprises a first sliding structure 622 carried on the plug-in piece 62, the first sliding structure 622 is configured for the plug-in piece 62 is slidably connected with the shell 91 when the rotatable plug 92 is inserted into the plug-in piece 62, so as to improve the connection stability between the electronic connector and the shell 91, reduce the force applied to the rotatable plug 92, and prolong the service life of the rotatable plug 92. Of which, the first sliding structure 622 preferably is a slideway, each plug-in block 621 is provided with one slideway, two slideways are respectively set on the two sides of the two plug-in blocks 621 facing with each other.

Referring to FIG. 8, in this embodiment, the guide plate 61 is further provided with a second sliding structure 623, the second sliding structure 623 is configured for the plug-in piece is slidably connected with the shell 91 when the rotatable plug 92 is inserted into the plug-in piece 62. The second sliding structure 623 enables the guide plate 61 to be connected with the shell 91, further limiting relative movement of the guide plate 61 with the shell 91, also limiting rotation of the rotatable plug 92, and improving the connection stability between the electronic connector and the external adapter 90.

The external adapter 90 is generally provided with a mounting block in the mounting groove 901, the second sliding structure 623 can be set between the two plug-in blocks 621 so as to be slidably connected with the mounting block. Referring to FIG. 8, in the present embodiment, the second sliding structure 623 is a sliding groove configured for being slidably connected with the mounting block.

Referring to FIG. 8, to limit the separation after the rotatable plug 92 is inserted into the electronic connector, the connecting seat 200 further comprises a clamping structure 624 carried on the guide plate 61, the clamping structure 624 is configured for being clamped with the shell 91. The clamping structure 624 can be clamped with the shell 91 when the rotatable plug 92 is inserted into the connecting seat 200, thus the electronic connector can be stably connected with the external adapter 90 without external forces.

Specifically, the clamping structure 624 is a bump located between the two plug-in blocks 621. The setting of the bump enhances operation feelings during connection, forming a clamping point to prevent users from excessive pressure.

The above embodiments further illustrate the contents of the present disclosure, but should not be construed as limiting the present disclosure. Without departing from the spirit and essence of the present disclosure, modifications and substitutions made to the methods, steps or conditions of the present disclosure all fall within the scope of the present disclosure. Unless particularly specified, the technical means used in the embodiments are conventional means well known to those skilled in the art.

What is claimed is:

1. A power adapter, comprising:

a base, having a mounting cavity;

a plug-in mechanism, having a plug body rotatably connected to the base and a swinging piece connected to the plug body and disposed in the mounting cavity; the swinging piece capable of performing circular motion around an axis of the plug body to drive the plug body to rotate; the swinging piece switchable between a first swinging position and a second swinging position through the circular motion; the plug body capable of electrically connecting with an external power supply when the swinging piece is at the second swinging position;

a reset mechanism, connected to the swinging piece and the base; the reset mechanism capable of applying a reset force to the swing piece and leading the swing piece to move towards the second swinging position when the swinging piece is at the first swinging position;

a limiting mechanism, having a limiting position and an unlocking position; the limiting mechanism capable of limiting the swinging piece to move when the swinging piece is at the first swinging position and the limiting mechanism is at the limiting position; the limiting mechanism further capable of releasing the limit of the swinging piece to cause the reset mechanism to release the reset force when the limiting mechanism is at the unlocking position;

wherein the reset mechanism comprises a reset piece connected to the swinging piece and a sliding piece connected to the reset piece; and the sliding piece is slidably connected to the base and capable of sliding between a first sliding position and a second sliding position; the reset piece is capable of applying a reset force to the swing piece and leading the swing piece to move towards the second swing position when the swing piece is at the first swing position; and the reset piece is capable of releasing the reset force to the swing piece and leading the swing piece to move from the first swing position to the second swing position, then leading the sliding piece to move from the first sliding position to the second sliding position.

2. The power adapter according to claim 1, wherein the base is provided with a slideway on a wall of the mounting cavity, the sliding piece is slidably connected to the slideway.

3. The power adapter according to claim 1, wherein the plug body comprises a rotating shaft rotatably connected to the base and a body pin connected to the rotating shaft; the body pin is capable of electrically connecting with an external power supply when the swinging piece is at the second swinging position; the swinging piece comprises a connecting part connected to the rotating shaft, and a swinging part connected to the connecting part and spaced from the rotating shaft; the reset piece is a torsion spring sleeved on the swinging part; one end of the reset piece is connected to the plug-in mechanism and the other end is connected to the sliding piece.

4. The power adapter according to claim 3, wherein the base is provided with a first storage slot, the body pin is stored in the first storage slot when the swinging piece is at the first swing position.

5. The power adapter according to claim 3, wherein the rotating shaft comprises a rotating part rotatably connected to the base and a limiting part connected to the rotating part;

the limiting part is provided with a limiting slot; the plug-in mechanism further comprises a limiting pin rotatably connected to the base; when the swinging piece is moved from the first swinging position to the second swinging position, the limiting part is capable of driving the limiting pin to rotate from a first matching position to a second matching position; the limiting pin rotates from the second matching position to the first matching position under an external force, to push the limiting part to rotate, and to cause the swinging piece to move from the second swinging position to the first swinging position; the limiting pin is at least partially received in the limiting slot when it is at the first matching position and it limits movement of the swinging piece, so that the swinging piece is located at the first swinging position; under the external force, the limiting pin is switchable between the second matching position and a third matching position where the limiting pin is plugged into the external power supply.

6. The power adapter according to claim 5, wherein the base is provided with a second storage slot; a free end of the limiting pin is received in the second storage slot when it is at the first matching position; the free end of the limiting pin is disposed outside the second storage slot when it is at the second matching position; the position of the second storage slot is corresponding to the position of the limiting groove.

7. The power adapter according to claim 5, wherein a free end of the limiting pin is provided with a slot, when the limiting pin is at the first matching position and the limiting mechanism is at a limiting position; the limiting mechanism is plugged into the slot; the limiting mechanism further moves out of the slot when the limiting mechanism is at an unlocking position.

8. The power adapter according to claim 1, wherein the limiting mechanism comprises a push button and an elastic piece; the push button has the limiting position and the unlocking position; the elastic piece is capable of applying an elastic force on the push button and leading it to move towards the limiting position when the push button is at the unlocking position.

9. The power adapter according to claim 1, wherein the power adapter further comprises a replaceable plug detachably connected to the base.

10. An electronic connector comprising the power adapter according to claim 1.

11. The electronic connector according to claim 10, wherein the electronic connector further comprises an electric wire and a connecting seat, one end of the electric wire is connected to the base and is electrically connected with the plug-in mechanism and the other end is electrically connected to the connecting seat, the connecting seat is capable of electrically connecting with an external adapter.

12. The electronic connector according to claim 10, wherein the connecting seat comprises a guide plate and a plug-in piece connected to the guide plate; the guide plate has a guide surface, the plug-in piece is set on the guide surface for matching with the external adapter to electrically connect with the external adapter; the guide surface is capable of limiting relative rotation between the guide plate and the external adapter.

13. The electronic connector according to claim 12, wherein the connecting seat further comprises a first sliding structure carried on the plug-in piece and/or a second sliding structure carried on the guide plate; the first sliding structure and the second sliding structure are both slidably connected with the external adapter.

14. The electronic connector according to claim 12, wherein the connecting seat further comprises a clamping structure carried on the guide plate and capable of being clamped with the external adapter.

* * * * *